Figure 1:
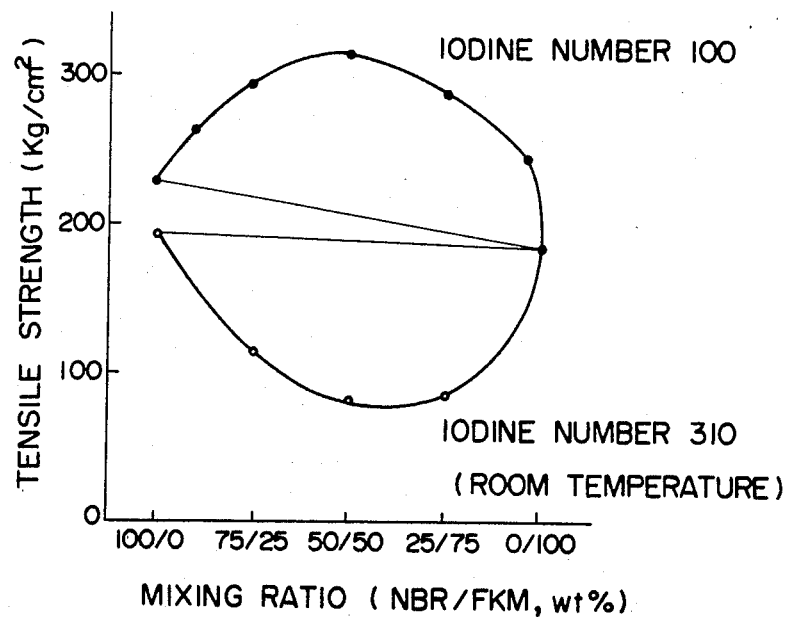

United States Patent [19]

Watanabe et al.

[11] Patent Number: 4,614,779
[45] Date of Patent: Sep. 30, 1986

[54] OIL- AND HEAT-RESISTANT RUBBER COMPOSITION COMPRISING NITRILE CONTAINING RUBBER AND FLUORINE CONTAINING RUBBER

[75] Inventors: Noboru Watanabe, Yokohama; Hideyoshi Shomoda, Kamakura; Yoichiro Kubo, Yokohama, all of Japan

[73] Assignee: Nippon Zeon Co., Ltd., Tokyo, Japan

[21] Appl. No.: 733,493

[22] Filed: May 13, 1985

[30] Foreign Application Priority Data

May 11, 1984 [JP] Japan .................................. 59-93007

[51] Int. Cl.$^4$ ........................ C08L 9/02; C08L 27/12; C08L 27/16
[52] U.S. Cl. .................................. 525/199; 525/192; 525/200; 525/105; 525/106
[58] Field of Search ................................. 525/192, 199

[56] References Cited

U.S. PATENT DOCUMENTS 4,048,261  9/1977  Starmer ............................. 525/199

FOREIGN PATENT DOCUMENTS 55-160037  12/1980  Japan .................................. 525/199
57-135844   8/1982  Japan .................................. 525/199
57-135843   8/1982  Japan .................................. 525/199

Primary Examiner—Carman J. Seccuro
Attorney, Agent, or Firm—Sherman and Shalloway

[57] ABSTRACT

An oil- and heat-resistant rubber composition comprising a nitrile group-containing hydrocarbon rubber having an iodine number of not more than 120 and a fluorine-containing rubber.

6 Claims, 2 Drawing Figures

OIL- AND HEAT-RESISTANT RUBBER COMPOSITION COMPRISING NITRILE CONTAINING RUBBER AND FLUORINE CONTAINING RUBBER

This invention relates to an oil- and heat-resistant rubber composition comprising a highly saturated nitrile group-containing hydrocarbon rubber and a fluorine rubber, which gives a vulcanizate having improved strength properties at ordinary and high temperatures.

Attempts have been made heretofore on various combinations of rubbers to mix at least two dissimilar rubbers and obtain a rubber material having the characteristics of the individual rubber components. However, there have been few combinations of dissimilar rubbers having greatly different chemical and physical properties which can give vulcanizates having practical tensile strength when vulcanized with sulfur vulcanization systems, organic peroxide vulcanization systems, etc.

In fields which require oil resistance and heat resistance, the use of a mixture of an oil resistant nitrile group-containing hydrocarbon rubber (such as an acrylonitrile-butadiene copolymer rubber) and a fluorine-containing rubber having excellent oil resistance and heat resistance has been studied. Even when the mixture is vulcanized with an organic peroxide which is a vulcanizer common to the two rubbers, the resulting vulcanizate does not have satisfactory strength properties at ordinary temperatures, and it is still desired to improve such a mixture.

It is an object of this invention to solve the aforesaid problem.

The present inventors have made extensive investigations in order to achieve this object, and finally found that a vulcanizate of a rubber composition comprising a nitrile group-containing hydrocarbon rubber having a specific iodine number and a fluorine-containing rubber shows strength properties at ordinary temperatures and high temperatures which far excel the additivity of these properties of the individual rubber components.

According to this invention, there is provided an oil- and heat-resistant rubber composition comprising a nitrile group-containing hydrocarbon rubber having an iodine number of not more than 120 and a fluorine-containing rubber.

In view of the need for oil resistance, the nitrile group-containing hydrocarbon rubber used in this invention has an unsaturated nitrile unit content of usually 5 to 60% by weight, preferably 10 to 50% by weight. In order to give strength properties at ordinary temperatures and high temperatures excelling the additivity of these properties by mixing with the fluorine-containing rubber, the iodine number of the nitrile group-containing hydrocarbon rubber should be within the range of 0 to 120. If the iodine number exceeds 120, the aforesaid properties are degraded, and the object of this invention cannot be achieved. The preferred iodine number is 0 to 100, especially 0 to 80. The "iodine number", as refered to herein, denotes that measured by the method of JIS K-0070.

Examples of the nitrile group-containing hydrocarbon rubber include rubbers obtained by hydrogenating the conjugated diene unit portion of unsaturated nitrile/conjugated diene copolymer rubbers; terpolymer rubbers of unsaturated nitrile/conjugated diene/ethylenically unsaturated monomer; rubbers resulting from hydrogenation of the conjugated diene unit portion of the above terpolymer rubbers; and unsaturated nitrile/ethylenically unsaturated monomer copolymer rubbers. These nitrile group-containing hydrocarbon rubbers can be obtained by using ordinary polymerization techniques and ordinary hydrogenation techniques. Needless to say, the method of producing these rubbers is not particularly limited in this invention.

Various monomers can be used in producing the nitrile group-containing hydrocarbon rubber used in this invention.

Examples of the unsaturated nitrile are acrylonitrile and methacrylonitrile, and 1,3-butadiene, 2,3-dimethylbutadiene, isoprene and 1,3-pentadiene may be cited as examples of the conjugated diene. The ethylenically unsaturated monomer includes, for example, unsaturated carboxylic acids or their ammonium or metal salts, such as acrylic acid, methacrylic acid, itaconic acid and maleic acid; alkyl esters of the aforesaid carboxylic acids such as methyl acrylate and butyl acrylate; alkoxyalkyl esters of the aforesaid unsaturated carboxylic acids such as methoxy acrylate, ethoxyethyl acrylate and methoxyethoxyethyl acrylate; acrylamide and methacrylamide; N-substituted (meth)acrylamides such as N-methylolmethacrylamide, N,N'-dimethylol(meth)acrylamide, N,N'-dimethylol(meth)acrylamide and N-ethoxymethyl(meth)acrylamide; and olefins such as ethylene and butene-1.

In the unsaturated nitrile/ethylenically unsaturated monomer copolymer rubber, a part of the unsaturated monomer may be substituted by a non-conjugated diene such as vinylnorbornene, dicyclopentadiene or 1,4-hexadiene.

Specific examples of the nitrile group-containing hydrocarbon rubber used in this invention are hydrogenation products of butadiene/acrylonitrile copolymer rubber and isoprene/acrylonitrile copolymer rubber; butadiene/methyl acrylate/acrylonitrile copolymer rubber, butadiene/acrylic acid/acrylonitrile copolymer rubber and butadiene/ethylene/acrylonitrile copolymer rubber, and hydrogenation products of these rubbers; and butyl acrylate/ethoxyethyl acrylate/vinyl chloroacetate/acrylonitrile copolymer rubber, ethyl acrylate/ethylene/acrylonitrile copolymer rubber and butyl acrylate/ethoxyethyl acrylate/vinylnorborenene/acrylonitrile copolymer rubber.

Examples of the fluorine-containing rubber used in this invention include tetrafluoroethylene/propylene copolymer rubber, tetrafluoroethylene/perfluoroalkyl-perfluorovinyl ether copolymer rubbers, vinylidene fluoride/hexafluoropropylene copolymer rubber, vinylidene fluoride/perfluoroalkyl perfluorovinyl ether copolymer rubbers, vinlyidene fluoride/pentafluoropropylene copolymer rubber, silicone oligomers containing a hexafluoropropylene vinyl group, fluorosilicone rubber and fluorophosphazene rubber. These are used singly or in combination. These examples are not limitative, and all rubbery polymers containing fluorine can be used in the present invention.

If the amount of the rubber component having a lesser mixing ratio in the rubber composition of this invention is less than 5% by weight, it is difficult to give a product which simultaneously has the characteristics of the individual rubber components. The optimum mixing ratio of the rubber components can be determined according to the purpose for which the final rubber composition is used.

Usually, the rubber composition of this invention may contain compounding chemicals such as vulcanization systems, reinforcing agents, fillers, plasticizers and antioxidants in addition to the rubber components.

An organic peroxide vulcanization system is especially preferred as the vulcanization system since it is common to the rubber components. A vulcanization system inherent to each of the rubber components may also be used.

Examples of the organic peroxide are di-t-butyl peroxide, t-butyl cumyl peroxide, dicumyl peroxide, 2,5-dimethyl-2,5-di-(t-butylperoxy)hexane, 2,5-dimethyl-2,5-di-(t-butylperoxy)-hexyne-3, 1,3-bis(t-butylperoxyisopropyl)benzene, 1,1-di-t-butylperoxycyclohexane, t-butyl perbenzoate and t-butylperoxy-isopropyl carbonate.

Crosslinking coagents may be used together with the organic peroxides. Examples of such coagents include polyfunctional monomers such as triallyl isocyanurate, trimethylolpropane trimethacrylate, ethylene dimethacrylate, diallyl phthalate, divinylbenzene and m-phenylene bismaleimide, 1,2-polybutadiene, and oxime compounds such as p-quinonedioxime.

Combinations of sulfur or sulfur-donating organic compounds with various accelerators, which are known as vulcanization systems for diene rubbers, may be cited as examples of the vulcanization systems inherent to the nitrile group-containing hydrocarbon rubber.

Examples of the vulcanization systems inherent to the fluorine-containing rubber are combinations of metal oxides such as magnesium oxide or calcium oxide with blocked derivatives of diamines such as hexamethylenediamine carbamate, N,N'-bis(cinnamylidene-1,6-hexylenediamine), N,N'-disalicylidene-1,2-alkanediamines, and combinations of quaternary ammonium salts or phosphine compounds with aromatic diols such as hydroquinone and bisphenol A.

Various other compounding agents usually employed in the rubber industry may be used in this invention without any particular limitation.

The amounts of the vulcanization systems and other compounding chemicals may be those which are used customarily, and are not limited in particular.

The rubber composition of this invention can be produced by mixing the rubber components with a vulcanization system (including a crosslinking coagent), a reinforcing agent such as silica and carbon black, a filler such as calcium carbonate and talc, a plasticizer, an antioxidant and ordinary compounding chemicals used in the rubber industry by using mixing machines normally used in the rubber industry, such as a Banbury mixer and a roll. The resulting rubber composition is molded into a shape suitable for its end use, and vulcanized into a final rubber product by using an ordinary vulcanizing device.

Since the vulcanizates of the rubber composition of this invention have excellent strength properties at ordinary temperatures and high temperatures and excellent oil resistance and heat resistance, they find extensive use as hoses, belts, diaphragms, general sealing materials [such as O-rings, various packers for gas and oil drilling and blow out preventers (B.O.P.)], and cables for crude oil pumps, or for production of rubber materials for use in geothermal power plants.

The following examples illustrate the present invention more specifically.

EXAMPLE 1

Acrylonitrile/butadiene copolymer rubber (to be abbreviated as NBR) having a bound acrylonitrile content of 34% by weight was dissolved in methyl isobutyl ketone, and in a pressure vessel, the butadiene units of NBR were partially hydrogenated in the presence of Pd-carbon as a catalyst to prepare partially hydrogenated NBR.

The partially hydrogenated NBR and a fluorine-containing rubber (abbreviated FKM) (Aflas 150P, a product of Asahi Glass Co., Ltd.) were mixed with other compounding chemicals by a cold roll in accordance with the recipe shown in Table 1. The resulting rubber compound was heated under pressure at 170° C. for 15 minutes to prepare a vulcanizate. The properties of the vulcanizate were measured in accordance with JIS K-6301, and the results are shown in Table 2.

Similar vulcanizates were prepared from butadiene/butyl acrylate/acrylonitrile terpolymer rubber, its partially hydrogenated product, and methyl acrylate/butyl acrylate/acrylonitrile terpolymer rubber, and their properties were measured. The results are also shown in Table 2.

TABLE 1

| | |
|---|---|
| Mixture of the partially hydrogenated NBR and FKM (see Table 2 for the mixing ratio) | 100 parts by weight |
| SRF carbon | 30 parts by weight |
| Peroximon F40*[1] | 6 parts by weight |
| TAIC (triallyl isocyanurate) | 5 parts by weight |

*[1]-bis-t-butyl peroxide of m,p-diisopropylbenzene made by Montecatini of Italy.

TABLE 2

| | Run No. | | | | | | | | | | | | | | |
|---|---|---|---|---|---|---|---|---|---|---|---|---|---|---|---|
| | Comparison | | | | | | Invention | | | | | Comparison | Invention | | |
| Test results | 1 | 2*[5] | 3*[5] | 4*[5] | 5*[5] | 6 | 7 | 8 | 9 | 10 | 11 | 12 | 13 | 14 | 15 |
| NBR [310] | 100 | 75 | 50 | 25 | — | | | | | | | | | | |
| Hydrogenated NBR [100] | | | | | | 100 | 90 | 75 | 50 | 25 | 8 | | | | |
| NBBR*[1] [136] | | | | | | | | | | | | 70 | | | |
| NBBR*[2] [24] | | | | | | | | | | | | | 70 | | |
| Hydrogenated NBBR*[3] [50] | | | | | | | | | | | | | | 70 | |
| NMBR*[4] [0] | | | | | | | | | | | | | | | 70 |
| FKM | — | 25 | 50 | 75 | 100 | — | 10 | 25 | 50 | 75 | 92 | 30 | 30 | 30 | 30 |
| Properties under normal condition | | | | | | | | | | | | | | | |
| (1) Room temperature | | | | | | | | | | | | | | | |
| Tensile strength (kg/cm²) | 194 | 115 | 80 | 80 | 180 | 230 | 248 | 292 | 310 | 280 | 240 | 110 | 262 | 279 | 208 |
| Elongation (%) | 120 | 90 | 80 | 100 | 180 | 240 | 260 | 270 | 260 | 260 | 220 | 80 | 280 | 240 | 340 |
| Tear strength (kg/cm) | 30 | 21 | 24 | 23 | 30 | 45 | 46 | 49 | 50 | 42 | 34 | 35 | 51 | 49 | 41 |
| Hardness (JIS) (point) | 70 | 71 | 70 | 71 | 73 | 68 | 69 | 70 | 71 | 71 | 72 | 75 | 74 | 75 | 71 |
| (2) 150° C. | | | | | | | | | | | | | | | |

TABLE 2-continued

| Test results | Comparison | | | | | | Invention | | | | | Comparison | Invention | | |
|---|---|---|---|---|---|---|---|---|---|---|---|---|---|---|---|
| Run No. | 1 | 2*5 | 3*5 | 4*5 | 5*5 | 6 | 7 | 8 | 9 | 10 | 11 | 12 | 13 | 14 | 15 |
| Tensile strenght (kg/cm$^2$) | 40 | 38 | 28 | 30 | 28 | 43 | 58 | 62 | 68 | 59 | 36 | 41 | 65 | 68 | 55 |
| Elongation (%) | 70 | 40 | 40 | 30 | 40 | 120 | 140 | 140 | 130 | 150 | 140 | 30 | 160 | 170 | 180 |
| Tear strength (kg/cm) | 14 | 12 | 11 | 9 | 8 | 25 | 25 | 26 | 25 | 20 | 14 | 20 | 34 | 35 | 24 |
| Hardness (JIS) (point) | 60 | 60 | 59 | 56 | 54 | 64 | 64 | 65 | 66 | 66 | 66 | 68 | 72 | 70 | 65 |
| Test tube aging test | | | (150° C. × 168 hrs.) | | | | | | | | | | | | |
| Percent change in tensile strength (%) | Measurement impossible | −80 | −40 | +18 | −20 | −4 | −3 | −2 | −1 | ±0 | Measurement impossible | −3 | −1 | −2 | |
| Percent change in elongation (%) | | −90 | −50 | −20 | −21 | −2 | −8 | −7 | −6 | −2 | | −2 | −1 | ±0 | |
| Change in hardness (point) | +8 | +9 | +6 | +7 | −7 | +2 | +3 | +2 | +1 | +1 | −1 | +13 | +3 | +2 | +3 |

*[1] Butadiene/butyl acrylate/acrylonitrile (= 20/30/41 wt. %)
*[2] Butadiene/butyl acrylate/acrylonitrile (= 5/62/33 wt. %)
*[3] Partial hydrogenation product of *[1].
*[4] Methyl acrylate/butyl acrylate/acrylonitrile (= 25/25/50 wt. %)
*[5] In Runs Nos. 2 to 5, the properties of the vulcanizates were measured after subjecting them to secondary heat-treatment at 170° C. for 4 hours.

The parenthesized figures in the above and other tables show iodine numbers.

The attached drawings are graphic representations of the data given in Table 2.

Figure 2:
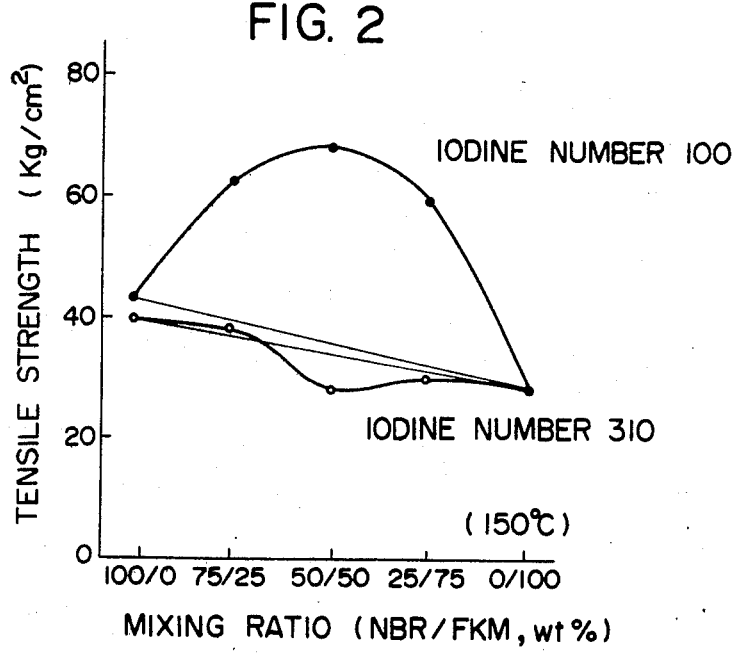

FIG. 1 shows the relation between the mixing ratio of NBR to FKM (abscissa) and the tensile strength at room temperature of the vulcanizate (ordinate), and FIG. 2 shows the relation between the mixing ratio of NBR to FKM (abscissa) and the tensile strength at 150° C. of the vulcanizate (ordinate).

It is seen from the results shown in Table 2 that the vulcanizate from the composition of this invention composed of the partially hydrogenated NBR, etc. and FKM has heat resistance (test tube aging test) which is the characteristic of the two copolymer rubbers, and shows tensile strength at room temperature and 150° C. excelling the additivity of these properties of the two copolymer rubbers.

Table 3 on a cold roll to form 70/30 (by weight) mixtures.

Each of the mixtures was mixed with the various compounding agents shown in Table 1 on a cold roll to form a rubber compound. The rubber compound was heated under pressure at 170° C. for 15 minutes to prepare a vulcanizate. The properties of the vulcanizate was tested in the same way as in Example 1, and the results are shown in Table 4.

Table 3

A: Tetrafluoroethylene/propylene copolymer rubber (Aflas 150P, a product of Asahi Glass Co.)
B: Vinylidene fluoride/tetrafluoroethylene/perfluoromethyl vinyl ether coplolymer rubber (Viton GLT, a product of Du Pont Co.)
C: Vinylidene fluoride/hexafluoropropylene copolymer rubber (DAIEL G-801, a product of Daikin Kogyo Co., Ltd.)

TABLE 4

| Test results | Comparison | | | | | Invention | | Comparison | | Invention | |
|---|---|---|---|---|---|---|---|---|---|---|---|
| Run No. | 16 | 17 | 18 | 19 | 20 | 21 | 22 | 23 | 24 | 25 | 26 |
| Hydrogenated NBR [130] | 100 | | | | 70 | | | | | | |
| Hydrogenated NBR [115] | | 100 | | | | 70 | | | | | |
| Hydrogenated NBR [100] | | | 100 | | | | 70 | | | 70 | 70 |
| FKM A | | | | 100 | 30 | 30 | 30 | | | | |
| FKM B | | | | | | | | 100 | | 30 | |
| FKM C | | | | | | | | | 100 | | 30 |
| Properties under normal condition | | | | | | | | | | | |
| (1) Room temperature | | | | | | | | | | | |
| Tensile strength (kg/cm$^2$) | 243 | 260 | 272 | 190 | 154 | 284 | 278 | 200 | 145 | 288 | 276 |
| Elongation (%) | 200 | 280 | 310 | 170 | 160 | 240 | 260 | 170 | 180 | 250 | 230 |
| Hardness (JIS) (point) | 72 | 68 | 68 | 72 | 71 | 70 | 69 | 75 | 76 | 68 | 67 |
| (2) 150° C. | | | | | | | | | | | |
| Tensile strength (kg/cm$^2$) | 45 | 42 | 44 | 28 | 40 | 58 | 53 | 24 | 29 | 49 | 61 |
| Elongation (%) | 140 | 150 | 140 | 40 | 40 | 150 | 180 | 30 | 40 | 180 | 170 |
| Tear strength (kg/cm) | 24 | 25 | 26 | 10 | 9 | 26 | 28 | 7 | 6 | 27 | 26 |
| Hardness (JIS) (point) | 66 | 65 | 64 | 55 | 50 | 67 | 69 | 56 | 62 | 69 | 70 |
| Test tube aging test | | | (150° C. × 168 hrs.) | | | | | | | | |
| Percent change in tensile strength (%) | −70 | −24 | −20 | +18 | Measurement impossible | −3 | −2 | +19 | +19 | −4 | −3 |
| Percent change in elongation (%) | −65 | −24 | −21 | −20 | | −9 | −6 | −20 | −16 | −6 | −5 |
| Change in hardness (point) | +8 | +5 | +3 | −7 | +7 | +1 | +1 | +5 | −6 | ±0 | ±0 |

EXAMPLE 2

Partially hydrogenated NBR rubbers having a bound acrylonitrile content of 34% by weight and an iodine number of 130, 115 and 100 respectively, which were prepared in the same way as in Example 1, were mixed respectively with the three FKM rubbers shown in

EXAMPLE 3

A rubber compound was prepared on a cold roll in accordance with the compounding recipe shown in Table 5 using a mixture of 70 parts by weight of partially hydrogenated NBR having a bound acrylonitrile content of 45% by weight and an iodine number of 105, which was prepared in the same way as in Example 1, and 30 parts by weight of FKM (Aflas 150P, a product of Asahi Glass Co.). The compound was heated under pressure at 170° C. for 15 minutes to obtain a vulcanizate. The properties of the vulcanizate were measured in the same way as in Example 1, and the results are shown in Table 6.

|  | Compound No. | | |
| --- | --- | --- | --- |
| Compounding agents | [I] | [II] | [III] |
| Hydrogenated NBR/FKM (70/30) | 100 | 100 | 100 |
| SRF carbon black | 30 | 30 | 30 |
| Organic peroxide* | 6 | 6 | |
| Stearic acid | | | 1 |
| TAIC | | 5 | |
| MgO | | | 3 |
| Ca(OH)$_2$ | | | 6 |
| 1,8-diazabicyclo[5.4.0]-undecene-7 salt of sorbic acid | | | 1 |
| Morpholine disulfide | | | 2 |

*Either one of the following compounds:
(a) dicumyl peroxide
(b) 2,5-dimethyl-2,5-di(t-butylperoxy)hexane
(c) 2,5-dimethyl-2,5-di-(t-butylperoxy)hexylene-3
(d) 1,3-bis(t-butylperoxyisopropyl)benzene

TABLE 6

| Test Results | Run No. Comparison | | | | | | | |
| --- | --- | --- | --- | --- | --- | --- | --- | --- |
| Compound No. | 27 [I] | 28 [I] | 29 [I] | 30 [III] | 31 [II] | 32 [II] | 33 [II] | 34 [II] |
| Peroxide* | (a) | (b) | (c) | — | (a) | (b) | (c) | (d) |
| Properties under normal condition | | | | | | | | |
| Tensile strength (kg/cm$^2$) | 268 | 259 | 273 | 210 | 284 | 269 | 294 | 272 |
| Elongation (%) | 310 | 320 | 340 | 300 | 280 | 290 | 310 | 270 |
| Hardness (JIS) (point) | 64 | 63 | 62 | 66 | 68 | 66 | 67 | 68 |
| Test tube aging test | (150° C. × 168 hrs.) | | | | | | | |
| Percent change in tensile strength (%) | +3 | −3 | −1 | −4 | +3 | −2 | +2 | −1 |
| Percent change in elongation (%) | −4 | −2 | +2 | −3 | −4 | −6 | −2 | −3 |

TABLE 6-continued

| Test Results | Run No. Comparison | | | | | | | |
| --- | --- | --- | --- | --- | --- | --- | --- | --- |
| Compound No. | 27 [I] | 28 [I] | 29 [I] | 30 [III] | 31 [II] | 32 [II] | 33 [II] | 34 [II] |
| Peroxide* | (a) | (b) | (c) | — | (a) | (b) | (c) | (d) |
| Change in hardness (point) | ±0 | ±0 | +1 | −2 | ±0 | ±0 | +1 | +1 |

*The same as the note to Table 2.

What is claimed is:

1. An oil- and heat-resistant rubber composition comprising a nitrile group-containing diene hydrocarbon rubber or an acrylate rubber, having a nitrile content of about 5 to 60% by weight and having an iodine number of not more than 120 and a fluorine-containing rubber.

2. The rubber composition of claim 1 comprising 5 to 95% by weight of the nitrile group-containing hydrocarbon rubber and 95 to 5% by weight of the fluorine-containing rubber.

3. The rubber composition of any one of claims 1 to 2 wherein the nitrile group-containing hydrocarbon rubber is at least one rubber selected from the group consisting of rubbers obtained by hydrogenating the conjugated diene unit portion of unsaturated nitrile/conjugated diene copolymer rubbers, unsaturated nitrile/conjugated diene/ethylenically unsaturated monomer terpolymer rubbers, and rubbers obtained by hydrogenating the conjugated diene unit portion of said terpolymer rubbers.

4. The rubber composition of claim 1 or 2 wherein the nitrile group-containing hydrocarbon rubber has an iodine number of from 0 to 100.

5. The rubber composition of claim 1 or 2 wherein the nitrile group-containing hydrocarbon rubber is selected from the group consisting of hydrogenation products of butadiene/acrylonitrile copolymer rubber and isoprene/acrylonitrile copolymer rubber; butadiene/methylacrylate/acrylonitrile copolymer rubber, butadiene/acrylic acid/acrylonitrile copolymer rubber, and butadiene/ethylene/acrylonitrile copolymer rubber, hydrogenation products of these rubbers; butylacrylate/ethoxyethylacrylate/vinyl chloroacetate/acrylonitrile copolymer rubber, ethylacrylate/ethylene/acrylonitrile copolymer rubber and butylacrylate/ethoxyethylacrylate/vinyl norbornene/acrylonitrile copolymer rubber.

6. The rubber composition of claim 1 or 2 wherein the fluorine-containing rubber is selected from the group consisting of tetrafluoroethylene/propylene copolymer rubber, tetrafluoroethylene/perfluoroalkylperfluorovinyl ether copolymer rubber, vinylidene fluoride/hexafluoropropylene copolymer rubber, vinylidene fluoride/pentafluoropropylene copolymer rubber, silicon oligomers containing a hexafluoropropylene vinyl group, fluorosilicone rubber and fluorophosphazene rubber.

* * * * *

Disclaimer 4,614,779.—*Noboru Watanabe*, Yokohama; *Hideyoshi Shomoda*, Kamakura; *Yoichiro Kubo*, Yokohama, all of Japan. OIL-AND HEAT-RESISTANT RUBBER COMPOSITION COMPRISING NITRILE CONTAINING RUBBER AND FLOURINE CONTAINING RUBBER. Patent dated Sept. 30, 1986. Disclaimer filed June 8, 1990, by the assignee, Nippon Zeon Co., Ltd.

Hereby enters this disclaimer to the remaining term of said patent.
[*Official Gazette September 18, 1990*]